US012044986B2

(12) United States Patent
Kadota

(10) Patent No.: US 12,044,986 B2
(45) Date of Patent: Jul. 23, 2024

(54) TONER CONVEYING DEVICE, AND CLEANING DEVICE AND IMAGE FORMING APPARATUS THEREWITH

(71) Applicant: KYOCERA Document Solutions Inc., Osaka (JP)

(72) Inventor: Masaki Kadota, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/247,853

(22) PCT Filed: Oct. 5, 2021

(86) PCT No.: PCT/JP2021/036782

§ 371 (c)(1),
(2) Date: Apr. 4, 2023

(87) PCT Pub. No.: WO2022/080182

PCT Pub. Date: Apr. 21, 2022

(65) Prior Publication Data

US 2023/0375963 A1 Nov. 23, 2023

(30) Foreign Application Priority Data

Oct. 12, 2020 (JP) ................................ 2020-171624

(51) Int. Cl.

*G03G 21/00* (2006.01)
*G03G 15/08* (2006.01)
*G03G 21/10* (2006.01)

(52) U.S. Cl.

CPC ..... *G03G 15/0891* (2013.01); *G03G 15/0889* (2013.01); *G03G 21/0017* (2013.01);
(Continued)

(58) Field of Classification Search

CPC .......... G03G 15/0891; G03G 15/0889; G03G 21/0017; G03G 21/0035; G03G 15/08;
(Continued)

(56) References Cited

U.S. PATENT DOCUMENTS 5,799,225 A * 8/1998 Abe .................... G03G 15/168 399/303
2002/0131799 A1 9/2002 Kubo ........................... 399/350
(Continued)

FOREIGN PATENT DOCUMENTS

JP 2002-278401 A 9/2002
JP 2005-077675 A 3/2005
(Continued)

OTHER PUBLICATIONS

Foreign Patent Doc N; JP-2011237615-A (Year: 2011).*

*Primary Examiner* — Arlene Heredia
*Assistant Examiner* — Laura Roth
(74) *Attorney, Agent, or Firm* — Stein IP, LLC

(57) ABSTRACT

A toner conveying device includes a toner conveying passage through which toner is conveyed, a conveying screw, and a brush member. The conveying screw includes a rotary shaft rotatably arranged inside the toner conveying passage and a helical blade formed on the outer circumferential face of the rotary shaft. The brush member has a number of brush bristles that swing while in contact with the outer circumferential face of the conveying screw and that are planted at a predetermined interval along the axial direction of the conveying screw. On the brush member, the blush bristles planted at one place are composed of one to three fibers, and the blush bristles are planted parallel to each other at a predetermined interval of 0.5- to 3 mm.

10 Claims, 7 Drawing Sheets

(52) U.S. Cl.
CPC ....... *G03G 21/0035* (2013.01); *G03G 21/105* (2013.01); *G03G 2221/1624* (2013.01)

(58) Field of Classification Search
CPC .. G03G 21/00; G03G 21/105; G03G 15/0893; G03G 2215/0827; G03G 2215/0838; G03G 2215/0841; G03G 2221/1624
See application file for complete search history.

(56) References Cited

U.S. PATENT DOCUMENTS

| | | | | |
|---|---|---|---|---|
| 2005/0117945 | A1* | 6/2005 | Lee | G03G 21/105 399/358 |
| 2006/0093955 | A1* | 5/2006 | Ohshima | G03G 21/0035 430/119.71 |
| 2022/0308501 | A1* | 9/2022 | Kadota | G03G 21/105 |
| 2022/0308519 | A1* | 9/2022 | Takagami | G03G 21/105 |
| 2023/0408953 | A1* | 12/2023 | Somete | G03G 21/00 |

FOREIGN PATENT DOCUMENTS

| | | | | | |
|---|---|---|---|---|---|
| JP | 2006-343371 | A | | 12/2006 | |
| JP | 2007-147773 | A | | 6/2007 | |
| JP | 2011237615 | A | * | 11/2011 | G03G 21/0035 |
| JP | 2011-248051 | A | | 12/2011 | |

* cited by examiner

TONER CONVEYING DEVICE, AND CLEANING DEVICE AND IMAGE FORMING APPARATUS THEREWITH

CROSS-REFERENCE TO RELATED APPLICATIONS

This application is a national stage of International Application No. PCT/JP2021/036782, filed Oct. 5, 2021, which claims the benefit of Japanese Application No. 2020-171624, filed Oct. 12, 2020, in the Japanese Patent Office, the disclosures of which are incorporated herein by reference.

TECHNICAL FIELD

The present invention relates to a toner conveying device for conveying waste toner removed off the surface of an image carrying member or toner to be fed to a developing device. The present invention also relates to a cleaning device and an image forming apparatus provided with such a toner conveying device.

BACKGROUND ART

Conventionally common image forming apparatuses such as copiers, printers, and facsimile machines using an electrophotographic process typically use powdery developer (hereinafter called toner) and use the processes of visualizing an electrostatic latent image formed on an image carrying member such as a photosensitive drum with the toner in a developing device, then transferring the toner image to a recording medium, and then fixing the image. Such image forming apparatuses incorporate a cleaning device for removing toner remaining on the surface of the photosensitive drum.

In such cleaning devices, due to mechanical stress, the waste toner collected from the surface of the drum has uneven additive distribution and particle diameters and, in addition, mixed with paper dusts and the like, has lower flowability, tending to solidify more easily. Owing to a recent trend of toner having increasingly low melting points, in a high-temperature environment, toner is prone to have lower flowability. Thus, especially in a high-temperature and high-humidity environment, waste toner with low flowability solidifies around a conveying screw (for example, between helical blades) to cause what is called blocking, inconveniently leading to difficulty in toner conveyance.

To cope with that, there have been proposed methods for preventing toner from causing blocking. For example, Patent Documents 1 and 2 disclose methods of preventing toner from attaching to a conveying screw by keeping a film-form flicker in contact with the conveying screw. Patent Document 3 discloses a method of keeping a brush member in contact with a rotary shaft and blades of a conveying screw.

LIST OF CITATIONS

Patent Literature

Patent Document 1: JP-A-2002-278401
Patent Document 2: JP-A-2006-343371
Patent Document 3: JP-A-2007-147773

SUMMARY OF THE INVENTION

Problem to be Solved by the Invention

Inconveniently, with the methods disclosed in Patent Documents 1 and 2, toner attaches to between the flickers and to a part where the flickers are raised by the blades of the conveying screw, and this degrades toner conveyance performance. On the other hand, the brush disclosed in Patent Document 3 is made of polypropylene and has a comparatively high fiber density of 15000 per square inch. With such a high-density brush, it is difficult for toner fed from above to pass through the brush, and thus the brush blocks the toner. Furthermore, if the brush is left in a high-temperature and high-humidity environment with toner held between fibers, the toner fixes to the brush, inconveniently spoiling its effect of loosening toner.

While the above discussion deals with an example of solidification of toner associated with conveyance of waste toner removed by a cleaning device, similar problems are encountered in a high-temperature and high-humidity environment also associated with conveyance of replenishment toner to be fed to a developing device.

In view of the problems mentioned above, an object of the present invention is to provide a toner conveying device which can effectively prevent toner from solidifying and thereby maintain stable toner conveyance performance as well as to provide a cleaning device and an image forming apparatus incorporating such a toner conveying device.

Means for Solving the Problem

To achieve the above object, a toner conveying device according to a first aspect of the present invention includes a toner conveying passage through which toner is conveyed, a conveying screw, and a brush member. The conveying screw includes a rotary shaft rotatably arranged inside the toner conveying passage and a helical blade formed on the outer circumferential face of the rotary shaft. The brush member has a number of brush bristles that swing while in contact with the outer circumferential face of the conveying screw and that are planted at a predetermined interval along the axial direction of the conveying screw. On the brush member, the brush bristles planted at one place are composed of one to three fibers, and the brush bristles are planted parallel to each other at a predetermined interval of 0.5 to 3 mm.

Advantageous Effects of the Invention

According to the first aspect of the present invention, a brush member that swings and thereby loosens waste toner to prevent its agglomeration and solidification is configured such that brush bristles planted at one place are composed of one to three fibers and that the brush bristles are planted parallel to each other at a fixed interval of 0.5 to 3 mm. In this way, waste toner conveyed by the conveying screw is not blocked by the brush member, and does not fix to the brush bristles even in a high-temperature and high-humidity environment. Thus, it is possible to maintain the cleaning performance of the brush member with respect to the conveying screw for a long period.

DESCRIPTION OF EMBODIMENTS

Figure 1:
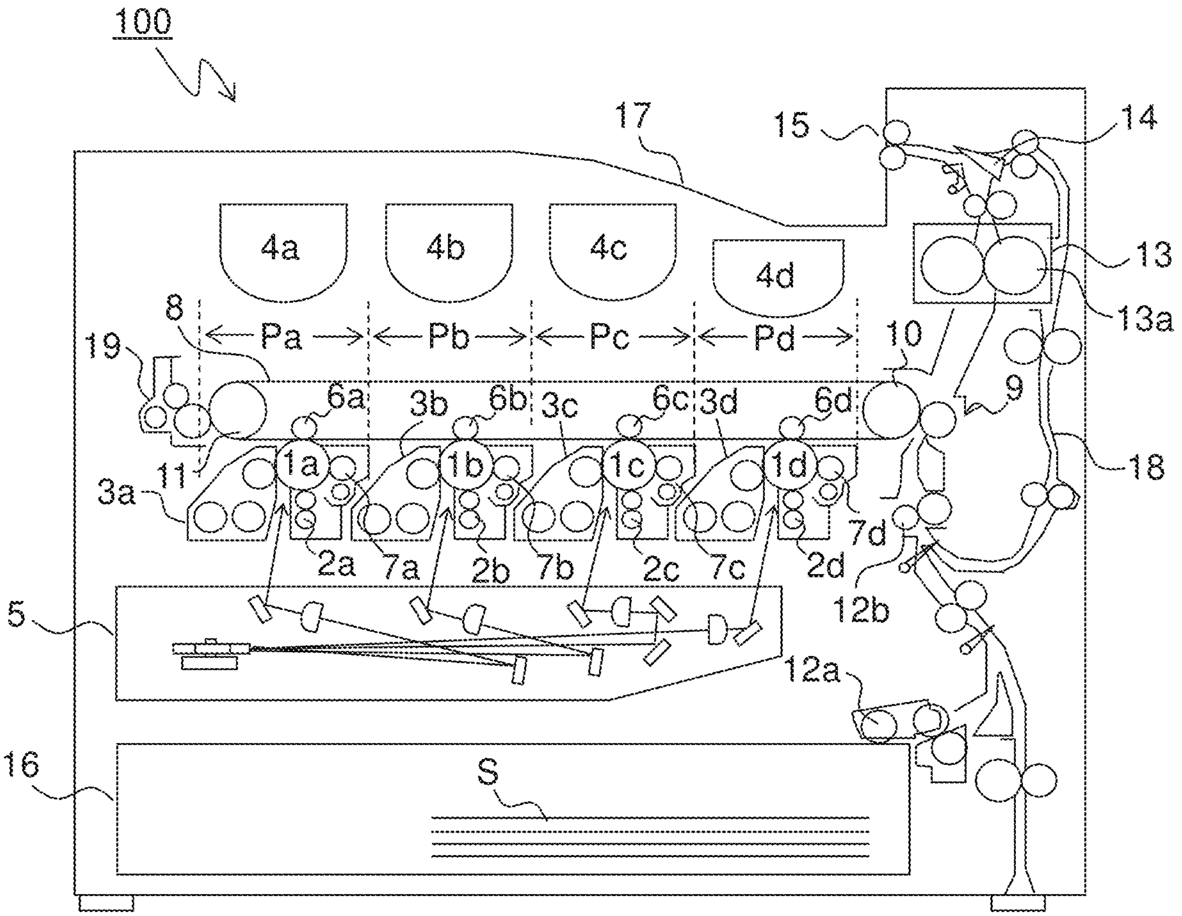
FIG. 1 is a schematic sectional view showing an internal configuration of an image forming apparatus 100 mounted with cleaning devices 7*a* to 7*d* according to the present invention.

With reference to the accompanying drawings, embodiments of the present invention will be described below. FIG. 1 is a schematic sectional view of an image forming apparatus 100 mounted with cleaning devices 7*a* to 7*d* according to the present invention. In the main body of the image forming apparatus 100, four image forming portions Pa, Pb, Pc and Pd are arranged in this order from upstream in the conveying direction (from the left side in FIG. 1). The image forming portions Pa to Pd are provided so as to correspond to images of four different colors (magenta, cyan, yellow, and black). The image forming portions Pa to Pd sequentially form images of magenta, cyan, yellow, and black through the processes of electrostatic charging, exposure, development, and transfer.

In these image forming portions Pa to Pd, photosensitive drums 1*a*, 1*b*, 1*c*, and 1*d* are respectively arranged which carry visible images (toner images) of the different colors. Furthermore, an intermediate transfer belt 8 which rotates counter-clockwise in FIG. 1 is provided adjacent to the image forming portions Pa to Pd. The toner images formed on the photosensitive drums 1*a* to 1*d* are primarily transferred sequentially, while being superimposed on each other, to the intermediate transfer belt 8 that moves while keeping contact with the photosensitive drums 1*a* to 1*d*. Then, the toner images transferred to the intermediate transfer belt 8 are, at a secondary transfer roller 9, transferred at once to a sheet S, which is one example of a recording medium. Then, after the toner images are fixed on the sheet S in a fixing portion 13, the sheet S is discharged from the main body of the image forming apparatus 100. An image forming process is performed with respect to the photosensitive drums 1*a* to 1*d* while they are rotated clockwise in FIG. 1.

The sheet S to which toner images are to be transferred is stored in a sheet cassette 16 arranged in a lower part of the image forming apparatus 100. The sheet S is conveyed via a sheet feeding roller 12*a* and a pair of registration rollers 12*b* to the secondary transfer roller 9.

Next, a description will be given of an image forming procedure on the image forming apparatus 100. When a user enters an instruction to start image formation, first, a main motor (not shown) starts rotating the photosensitive drums 1*a* to 1*d*. Then, charging rollers 21 (see FIG. 2) in charging devices 2*a* to 2*d* electrostatically charge the surfaces of the photosensitive drums 1*a* to 1*d* uniformly. Next, an exposure device 5 irradiates the surfaces of the photosensitive drums 1*a* to 1*d* with a beam of light (laser light) to form on them electrostatic latent images reflecting an image signal.

Developing devices 3*a* to 3*d* are loaded with predetermined amounts of toner of magenta, cyan, yellow, and black respectively. When, through formation of toner images, which will be described later, the proportion of toner in a two-component developer stored in the developing devices 3*a* to 3*d* falls below a determined value, toner is supplied from toner containers 4*a* to 4*d* to the developing devices 3*a* to 3*d* respectively. The toner in the developer is fed from developing rollers 25 (see FIG. 2) in the developing devices 3*a* to 3*d* to the photosensitive drums 1*a* to 1*d* respectively, and electrostatically attaches to them. In this way, toner images corresponding to the electrostatic latent images formed through exposure to light from the exposure device 5 are formed.

Then, primary transfer rollers 6*a* to 6*d* apply electric fields of a prescribed transfer voltage between themselves and the photosensitive drums 1*a* to 1*d*, and thus the toner images of magenta, cyan, yellow, and black respectively on the photosensitive drums 1*a* to 1*d* are primarily transferred onto the intermediate transfer belt 8. These images of four colors are formed in a predetermined positional relationship with each other that is prescribed for formation of a predetermined full-color image. After that, in preparation for the subsequent formation of new electrostatic latent images, the residual toner remaining on the surfaces of the photosensitive drums 1*a* to 1*d* is removed by cleaning blades 28 (see FIG. 2) in the cleaning devices 7*a* to 7*d*.

As a driving roller 10 is driven to rotate by a belt drive motor (not shown) and the intermediate transfer belt 8 starts to rotate counter-clockwise, the sheet S is conveyed with predetermined timing from the pair of registration rollers 12*b* to the secondary transfer roller 9 provided adjacent to the intermediate transfer belt 8, where the full-color image is transferred to it. The sheet S to which the toner images have been transferred is conveyed to the fixing portion 13. Toner remaining on the surface of the intermediate transfer belt 8 is removed by a belt cleaning unit 19.

The sheet S conveyed to the fixing portion 13 is heated and pressed by a pair of fixing rollers 13*a* so that the toner images are fixed on the surface of the sheet S, and thus the predetermined full-color image is formed on it. The conveyance direction of the sheet S on which the full-color image has been formed is switched by a branch portion 14 branching into a plurality of directions, and thus the sheet S is directly (or after being conveyed to a double-sided conveyance path 18 and thus being subjected to double-sided printing) discharged onto a discharge tray 17 by a pair of discharge rollers 15.

Figure 2:
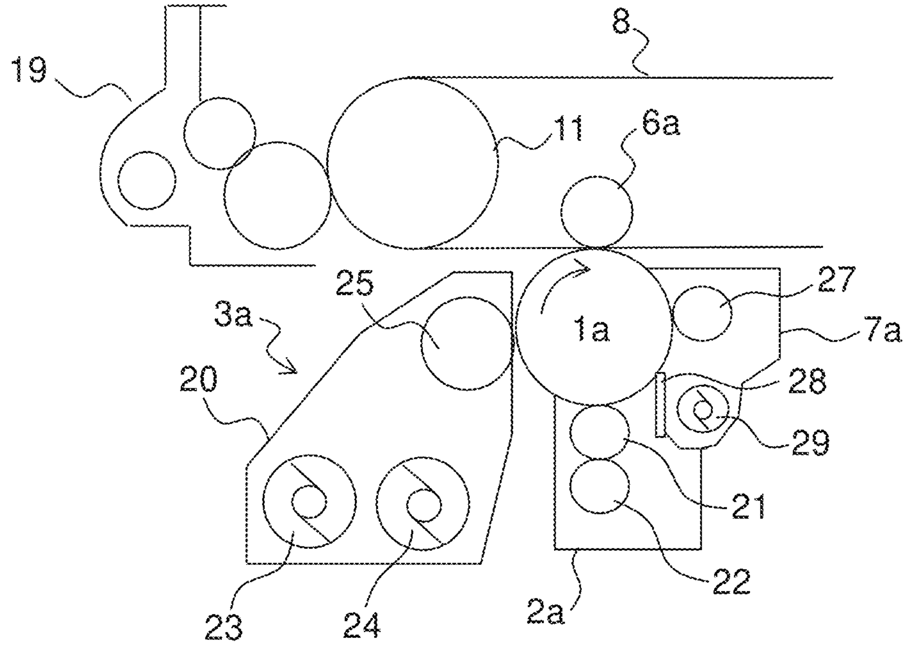
FIG. 2 is a partly enlarged view of and around an image forming portion Pa in FIG. 1.
Figure 3:
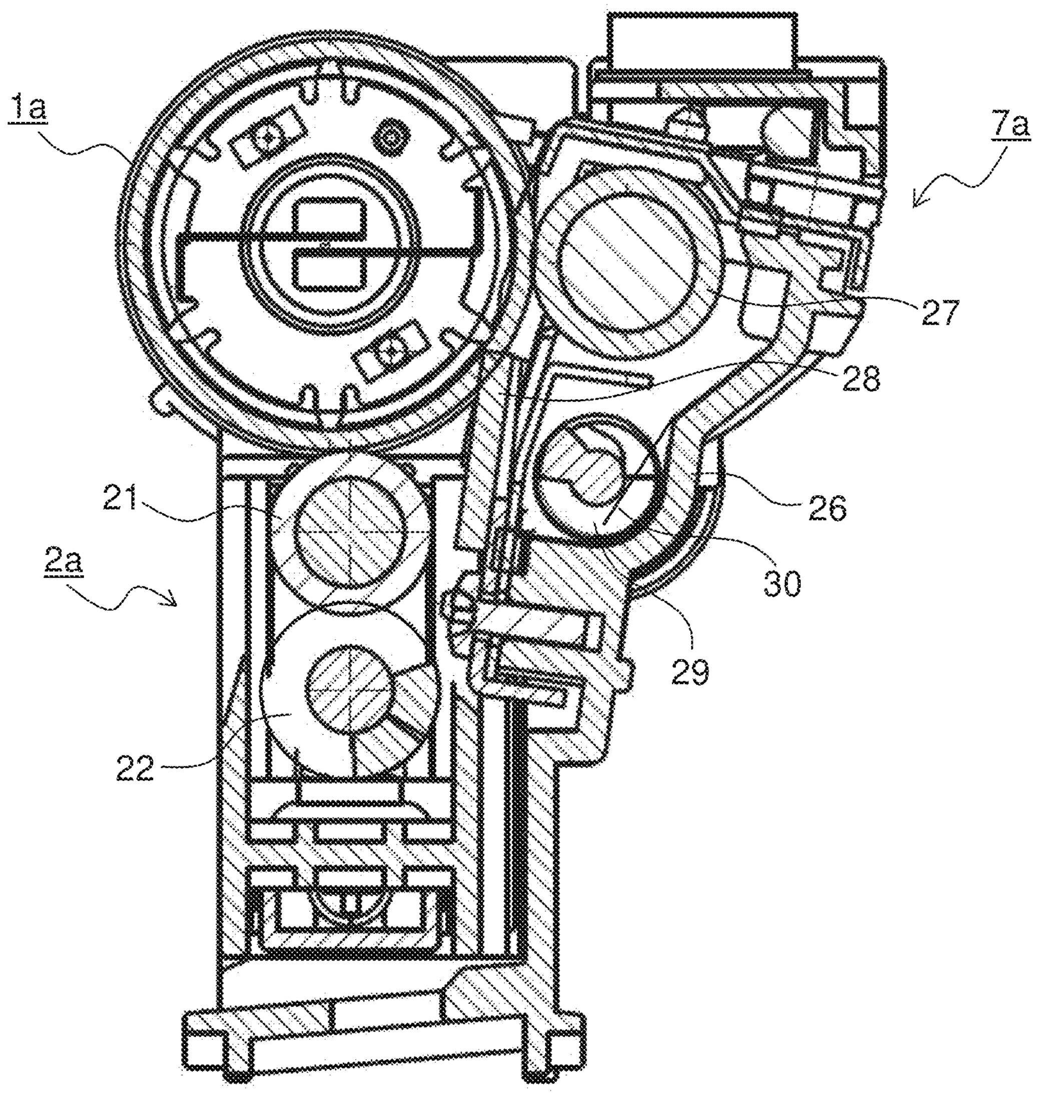
FIG. 3 is a side sectional view showing the structure of and around the cleaning device 7*a* according to a first embodiment of the present invention.

FIG. 2 is an enlarged view of and around the image forming portion Pa in FIG. 1. FIG. 3 is a side sectional view showing the structure of and around the cleaning device 7*a* according to a first embodiment of the present invention shown in FIG. 2. The image forming portion Pa including the photosensitive drum 1*a*, the charging device 2*a*, and the cleaning device 7*a* will be described in detail below. Since the image forming portions Pb to Pd have basically similar structures, no overlapping description will be repeated.

As shown in FIG. 2, around the photosensitive drum 1*a*, there are arranged, along the drum rotation direction (clockwise in FIG. 2), a charging device 2*a*, a developing device 3*a*, a cleaning device 7*a*, and, across the intermediate transfer belt 8, a primary transfer roller 6*a*. In addition, upstream of the photosensitive drum 1*a* in the rotation direction of the intermediate transfer belt 8, a belt cleaning unit 19 is arranged so as to face a tension roller 11 across the intermediate transfer belt 8.

The photosensitive drum 1*a* is a drum tube of aluminum coated with a photosensitive layer around its outer circumferential face. Used as the photosensitive layer is, for example, an organic photosensitive layer (OPC) using an organic photoconductor or an inorganic photosensitive layer such as an amorphous silicon (a-Si) photosensitive layer produced by vapor deposition of silane gas and the like.

The charging device 2*a* includes the charging roller 21 which makes contact with the photosensitive drum 1*a* to apply a charging bias to the surface of the drum and a brush roller 22 for cleaning the charging roller 21. The developing device 3*a* includes, inside a developer container 20, two stirring/conveying members composed of a stirring/conveying screw 23 and a feeding/conveying screw 24, and a developing roller 25, and develops an electrostatic latent image into a toner image by making the toner carried on the surface of a developing roller 26 fly to the surface of the photosensitive drum 1*a*.

The cleaning device 7*a* (toner conveying device) includes a housing 26 (toner conveying passage), a rubbing roller 27, a cleaning blade 28, a conveying screw 29, and a brush member 30. The housing 26 has an opening that faces the photosensitive drum 1*a* and houses the rubbing roller 27, the cleaning blade 28, the conveying screw 29, and the brush member 30.

The rubbing roller 27 makes contact with the surface (outer circumferential face) of the photosensitive drum 1*a* via the opening in the housing 26. The rubbing roller 27 is rotatably pivoted on a side plate (not shown) of the housing 26 in the front-rear direction (the direction perpendicular to the plane of FIG. 3). The rubbing roller 27 is driven to rotate by an unillustrated driving means in the same direction (width direction) as the photosensitive drum 1*a* at the contact face with it. In this way, unused toner remaining on the surface of the photosensitive drum 1*a* is removed while the surface of the photosensitive drum 1*a* is rubbed and polished.

The rubbing roller 27 is controlled to have a linear velocity higher than (for example, 1.2 times as high as) that of the photosensitive drum 1*a*. The rubbing roller 27 can be, for example, a metal shaft that has formed around it as a roller member a foamed material layer with an Asker C hardness of 55 made of EPDM rubber. The material for the roller member is not limited to EPDM rubber; it can be a member of any other rubber or foamed rubber preferably with an Asker C hardness of 10 to 90.

The cleaning blade 28 makes contact with the photosensitive drum 1*a* downstream, in the rotation direction of the photosensitive drum 1*a* (clockwise direction in FIG. 3), of the contact portion at which the photosensitive drum 1*a* and the rubbing roller 27 make contact with each other. Used as the cleaning blade 28 is, for example, a blade made of polyurethane rubber with a JIS hardness of 78 and a thickness of 2 mm. The material, hardness, and dimensions of the cleaning blade 28 and its fitted angle, overlap, and pressing force, etc. with respect to the photosensitive drum 1*a* are set appropriately in accordance with the specifications of the photosensitive drum 1*a*.

Figure 4:
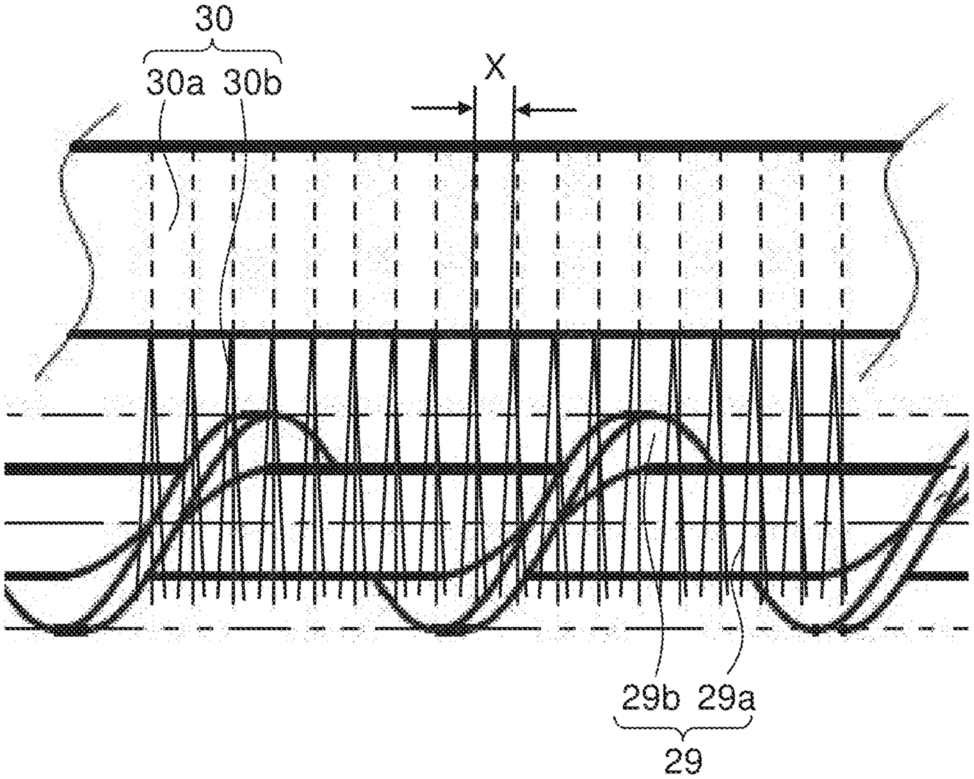
FIG. 4 is a partly enlarged view of a conveying screw 29 and a brush member 30 in the cleaning device 7*a* of the first embodiment as seen from the radial direction.

The conveying screw 29 is arranged in a lower part of the housing 26, and includes a rotary shaft 29*a* and a helical conveying blade 29*b* formed integrally with an outer circumferential face of the rotary shaft 29*a* (for either, see FIG. 4). The rotary shaft 29*a* is rotatably pivoted on a side plate of the housing 26 in the front-rear direction. The waste toner that is scraped off the photosensitive drum 1*a* by the rubbing roller 27 and the cleaning blade 28 and is stagnating in the housing 26 is conveyed in the axial direction as the conveying screw 29 rotates and is discharged out of the cleaning device 7*a*.

The brush member 30 is arranged between the housing 26 of the cleaning device 7 and the conveying screw 29. As shown in FIG. 3, the brush member 30 is at one end fixed to the inner wall face of the housing 26, and is at the other end left as a free end to extend up to a position where it makes contact with the conveying screw 29.

FIG. 4 is a partly enlarged view of the conveying screw 29 and the brush member 30 in the cleaning device 7*a* of the first embodiment as seen from the radial direction (direction perpendicular to the rotary shaft 29*a*). The brush member 30 is composed of a ribbon-like base portion 30*a* that extends along the axial direction of the conveying screw 29 (left-right direction in FIG. 4) and a large number of brush bristles 30*b* planted on the base portion 30*a* at equal intervals in its longitudinal direction. The brush bristles 30*b* project from the base portion 30*a* perpendicularly to the rotary shaft 29*a* of the conveying screw 29. The brush bristles 30*b* overlap the rotary shaft 29*a* and the conveying blade 29*b* of the conveying screw 29 and extend up to a position where their tip ends overhang the rotary shaft 29*a*.

Figure 5:
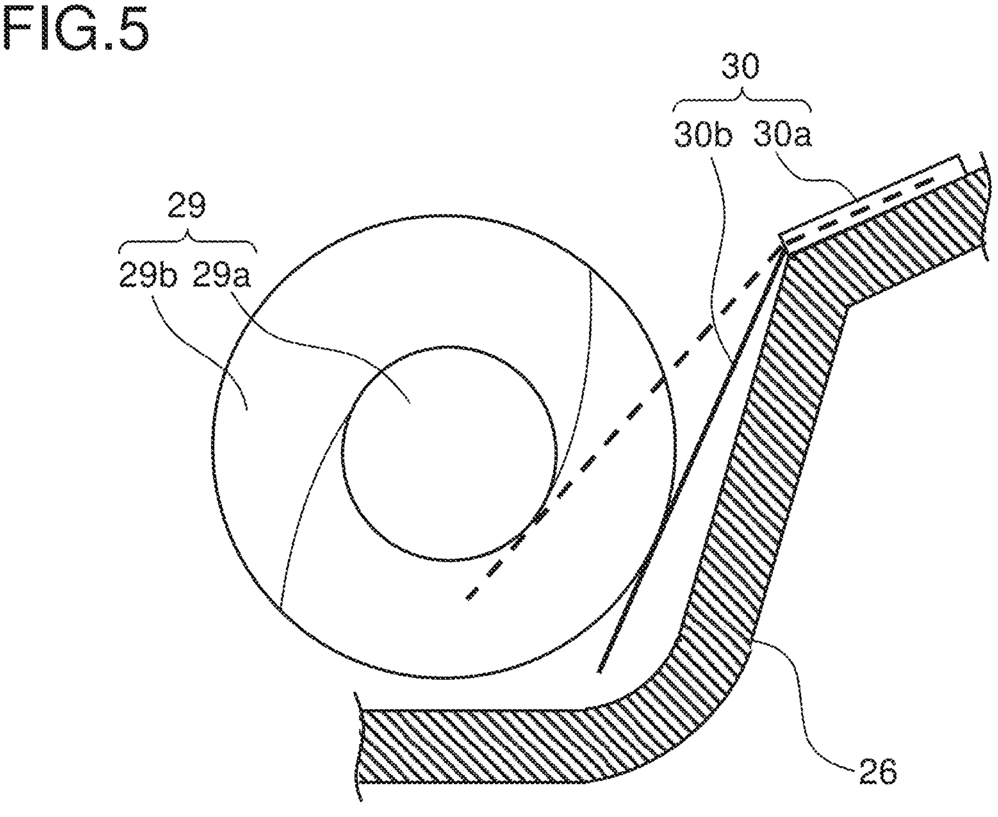
FIG. 5 is a cross-sectional view of the conveying screw 29 and the brush member 30 in the cleaning device 7*a* of the first embodiment as seen from the axial direction.

FIG. 5 is a cross-sectional view of the conveying screw 29 and the brush member 30 in the cleaning device 7*a* of the first embodiment as seen from the axial direction. As the conveying screw 29 rotates, the brush bristles 30*b* swing between the inner face of the housing 26 and the conveying screw 29 by repeatedly reciprocating between a state (indicated by a solid line in FIG. 5) where the brush bristles 30*b* are pushed down by the conveying blade 29*b* to be elastically deformed and a state (indicated by a broken line in FIG. 5) where, due to their restoring force, the brush bristles 30*b* are in contact with the rotary shaft 29*a*. In this way, the stagnant toner around the conveying screw 29 is loosened by the tip ends of the brush bristles 30*b* and is moved by the conveying screw 29 without solidifying; thus, the waste toner inside the housing 26 is conveyed out of it efficiently.

One bundle of brush bristles 30*b* is composed of one to three synthetic resin fibers. The thickness of each fiber is about 0.1 to 0.4 mm. The interval (pitch) X of the brush bristles 30*b* in the axial direction of the rotary shaft 29*a* is 0.5 to 3 mm. That is, in the brush member 30 used in this embodiment, the density of brush bristles 30*b* is significantly lower than in conventional brush members. With this design, the waste toner conveyed by the conveying screw 29 is not blocked by the brush member 30, and does not fix to the brush bristles 30*b* even in a high-temperature and high-humidity environment. Thus, it is possible to maintain the cleaning performance of the brush member 30 with respect to the conveying screw 29 for a long period.

Figure 6:
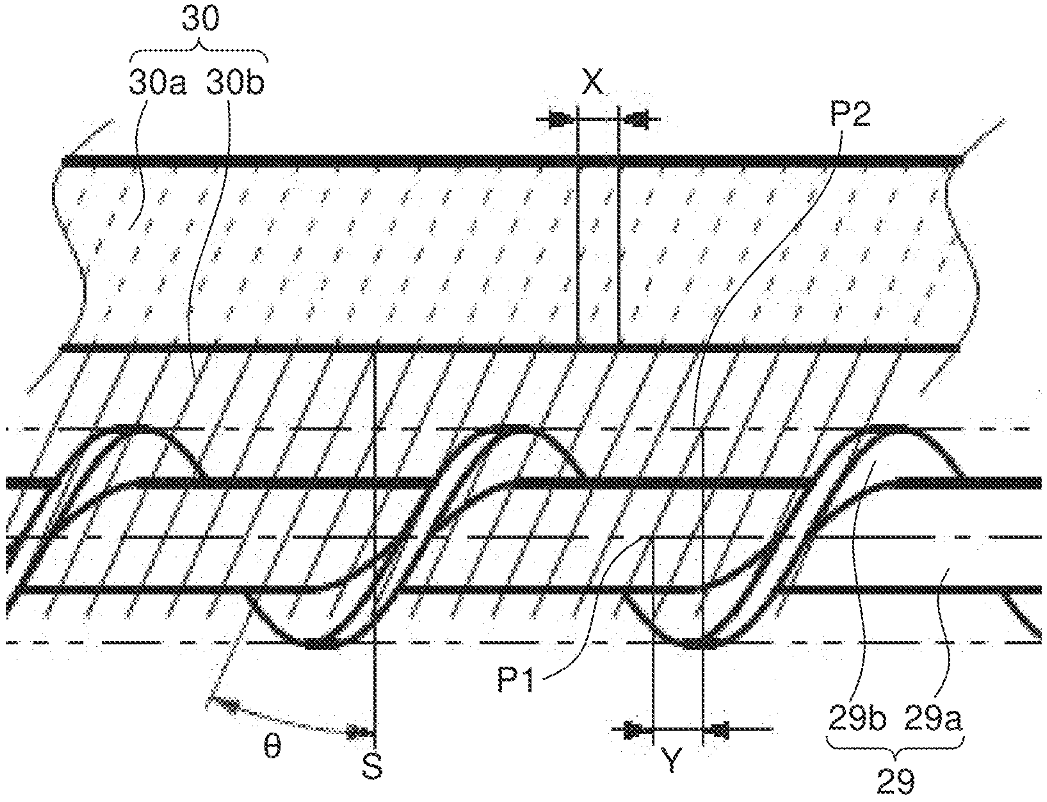
FIG. 6 is a partly enlarged view, as seen from the radial direction, of a conveying screw 29 and a brush member 30 used in a cleaning device 7*a* according to a second embodiment of the present invention.

FIG. 6 is a partly enlarged view, as seen from the radial direction, of a conveying screw 29 and a brush member 30 used in a cleaning device 7*a* according to a second embodiment of the present invention. In this embodiment, brush bristles 30*b* of the brush member 30 are planted on a base portion 30*a* not perpendicularly to a rotary shaft 29*a* but at a predetermined angle to it. In other respects, the structure here is similar to that in the first embodiment.

In this embodiment, the angle θ of the brush bristles 30*b* relative to a plane S perpendicular to the rotary shaft 29*a* is set such that, when the points at which the same brush bristle 30*b* makes contact with the rotary shaft 29*a* and with the helical blade 29*b* are represented by P1 and P2 respectively, the distance Y between P1 and P2 in the axial direction is larger than the pitch X of the brush bristles 30*b*.

With this design, the brush bristles 30*b* make contact with the entire outer circumferential face of the rotary shaft 29*a* and with the helical blade 29*b* of the conveying screw 29 uniformly (evenly) in the axial direction; thus, the waste toner can be loosened efficiently. Even at places where the brush bristles 30*b* do not make contact with those, the brush bristles 30*b* being present at a predetermined distance from the rotary shaft 29*a* helps suppress attachment of toner in the height (radial) direction.

Figure 7:
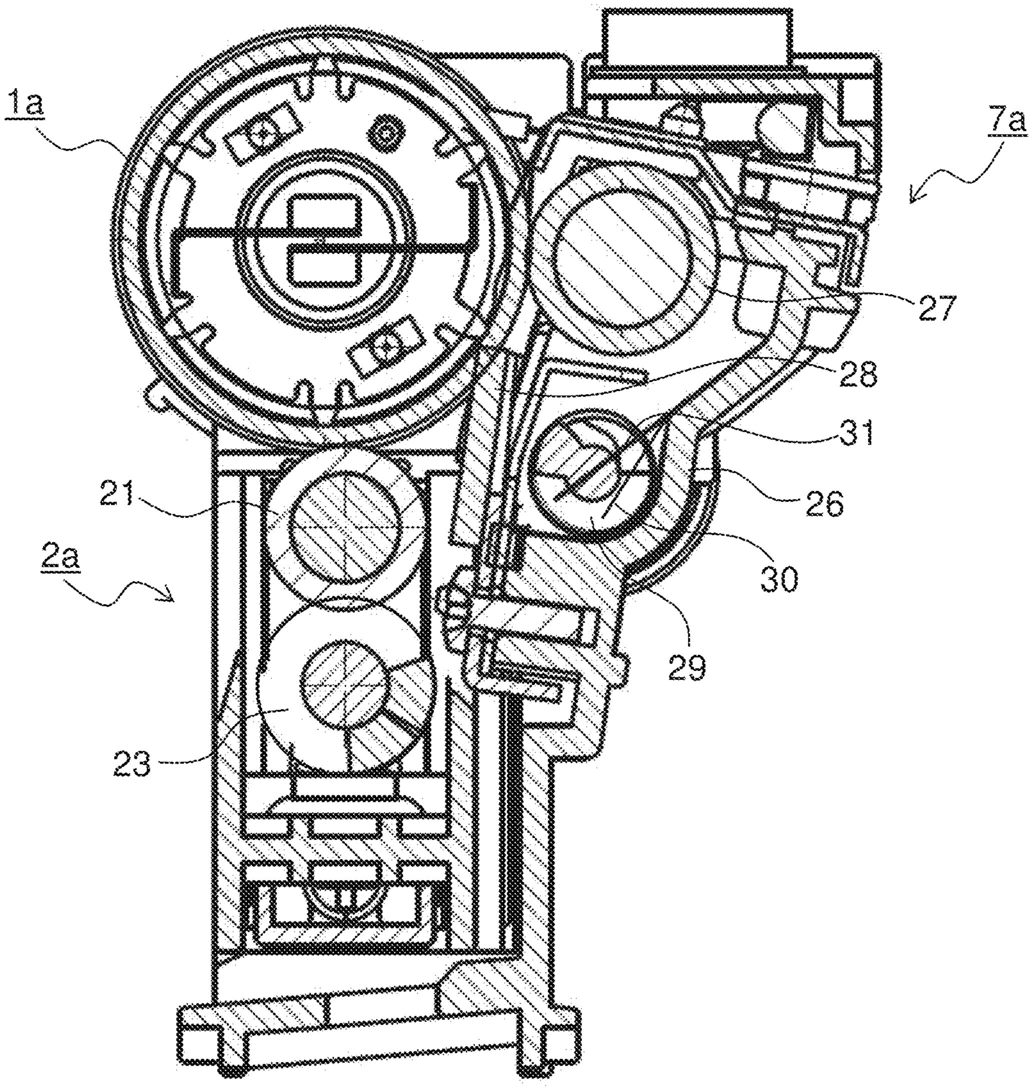
FIG. 7 is a side sectional view showing the structure of and around a cleaning device 7*a* according to a third embodiment of the present invention.
Figure 8:
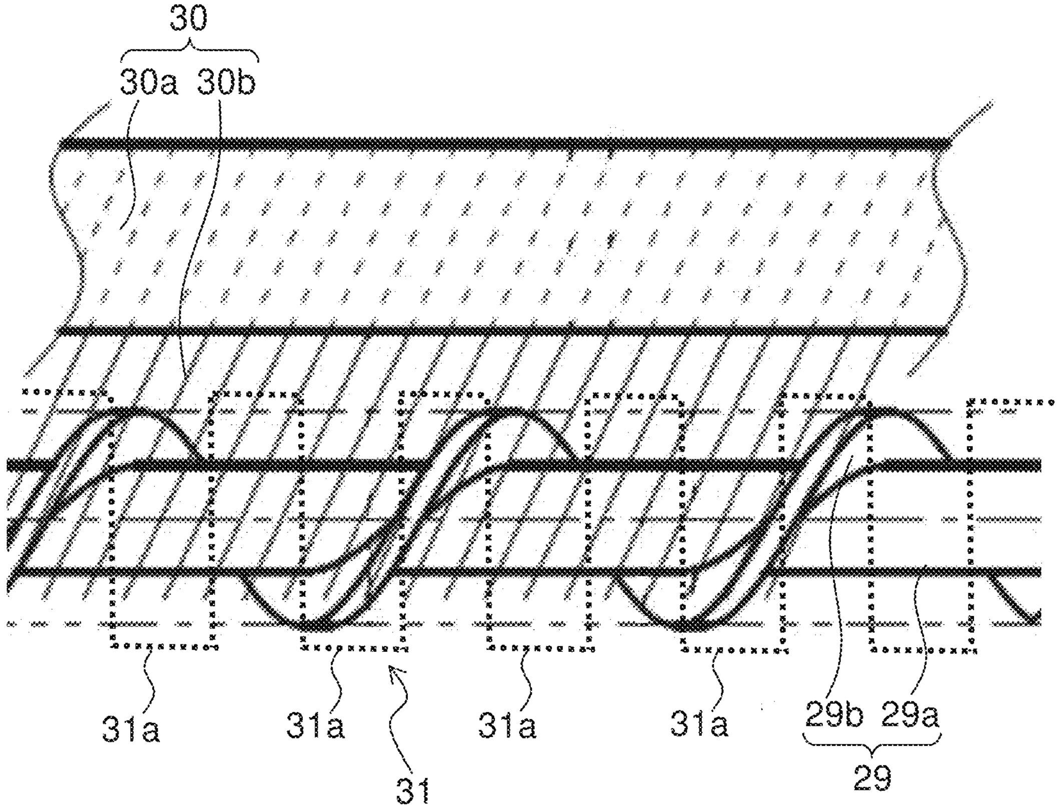
FIG. 8 is a partly enlarged view of a conveying screw 29, a brush member 30, and a flicker 31 in the cleaning device 7*a* of the third embodiment as seen from the radial direction.
Figure 9:
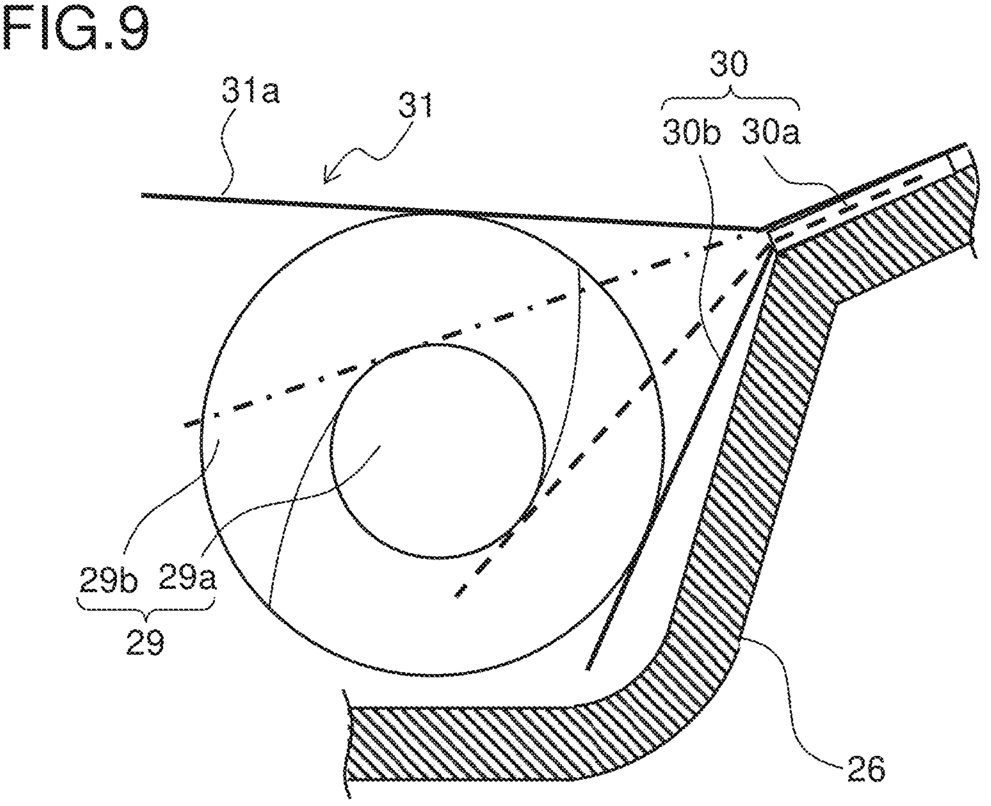
FIG. 9 is a cross-sectional view of the conveying screw 29, the brush member 30, and the flicker 31 in the cleaning device 7*a* of the third embodiment as seen from the axial direction.

FIG. 7 is a side sectional view showing the structure of and around a cleaning device 7*a* according to a third embodiment of the present invention. FIG. 8 is a partly enlarged view of a conveying screw 29, a brush member 30, and a flicker 31 in the cleaning device 7*a* of the third embodiment as seen from the radial direction. FIG. 9 is a cross-sectional view of the conveying screw 29, the brush member 30, and the flicker 31 in the cleaning device 7*a* of the third embodiment as seen from the axial direction. For easy understanding of the positional relationship, in FIG. 8, the flicker 31 is indicated by a broken line. In this embodiment, the flicker 31 is arranged opposite the brush member 30 across the conveying screw 29 (at the rubbing roller 27 side). In other respects, the structure of the cleaning device 7*a* here is similar to that in the second embodiment.

The flicker 31 is a film-form member that extends over the entire region of the conveying screw 29 in the axial direction (the direction perpendicular to the plane of FIG. 7). The flicker 31 is, at one end in the width direction perpendicular to the longitudinal direction, fixed at a position where it overlaps the brush member 30 on the inner wall face of the housing 26, and is, at the other end, left as a free end that extends up to a position where it makes contact with the conveying screw 29. At the free end side, a large number of scraping pieces 31*a* are formed with a predetermined pitch to make contact with the outer circumferential face of the conveying screw 29 from the side opposite from the brush bristles 30*b*. The scraping pieces 31*a* are formed perpendicularly to the rotary shaft 29*a* of the conveying screw 29 at a predetermined interval larger than the pitch of the brush bristles 30*b*.

There is no particular limitation on the material of the flicker 31 so long as it is an elastic material that swings when in contact with the helical blade 29*b* of the conveying screw 29; it is possible to use a sheet of any of various synthetic resins with low frictional resistance such as a sheet of polyethylene terephthalate (PET) (a sheet of Lumirror (registered trade-mark)), a sheet of Teflon (registered trademark), or a sheet of Kapton. A sheet of Lumirror is preferable from the perspective of cost, durability, and the like.

As the conveying screw 29 rotates, the scraping pieces 31*a* swing between the conveying screw 29 and the rubbing roller 27 by repeatedly reciprocating between a state (indicated by a solid line in FIG. 9) where the flicker 31 is pushed up by the helical blade 29*b* to be elastically deformed and a state (indicated by a dash-dot line in FIG. 9) where the flicker 31 is, due to its restoring force, in contact with the rotary shaft 29*a*. In this way, the stagnant toner around below the rubbing roller 27 is loosened by the tip ends of the scraping pieces 31*a* and is moved to around the conveying screw 29 without solidifying; thus, the waste toner inside the housing 26 is conveyed out of it efficiently.

With the structure according to this embodiment, waste toner around the conveying screw 29 is loosened by the brush member 30 and the flicker 31; thus, attachment of toner to the conveying screw 29 can be suppressed more effectively than in the first and second embodiments.

The rubbing roller 27 has, other than a function of removing unused toner remaining on the surface of the photosensitive drum 1*a*, also a function of polishing the surface of the photosensitive drum 1*a* by keeping toner containing abrasive between itself and the photosensitive drum 1*a*. Thus, toner easily stagnates around the contact portion at which the rubbing roller 27 makes contact with the photosensitive drum 1*a*. However, by preventing agglomeration and solidification of toner around the rubbing roller 27 using the flicker 31, it is possible to efficiently refresh the toner used for polishing the surface of the photosensitive drum 1*a*, and thus to improve the polishing effect.

There is no particular limitation on the length, width, and thickness of the flicker 31 and the size and pitch of the scraping pieces 31*a*; they can be set as necessary in accordance with the outer diameter, pitch, and the like of the conveying screw 29. Here, the brush member 30 is arranged between the conveying screw 29 and the housing 26, and the flicker 31 is arranged above the conveying screw 29. However, the arrangement of the brush member 30 and the flicker 31 can be the other way around.

The embodiment described above is in no way meant to limit the present invention, which thus allows for many modifications and variations within the spirit of the present invention. For example, although the embodiments described above only deal with a structure having a rubbing roller 27 and a cleaning blade 28 as a polishing system for cleaning devices 7*a* to 7*d*, a structure according to the present invention can be applied to various types of cleaning devices including a conveying screw 29, such as one having a rubbing roller 27 alone or a cleaning blade 28 alone, one having, instead of a rubbing roller 27, a cleaning roller with only a cleaning function, and one having, instead of a cleaning blade 28, a fur brush.

Figure 10:
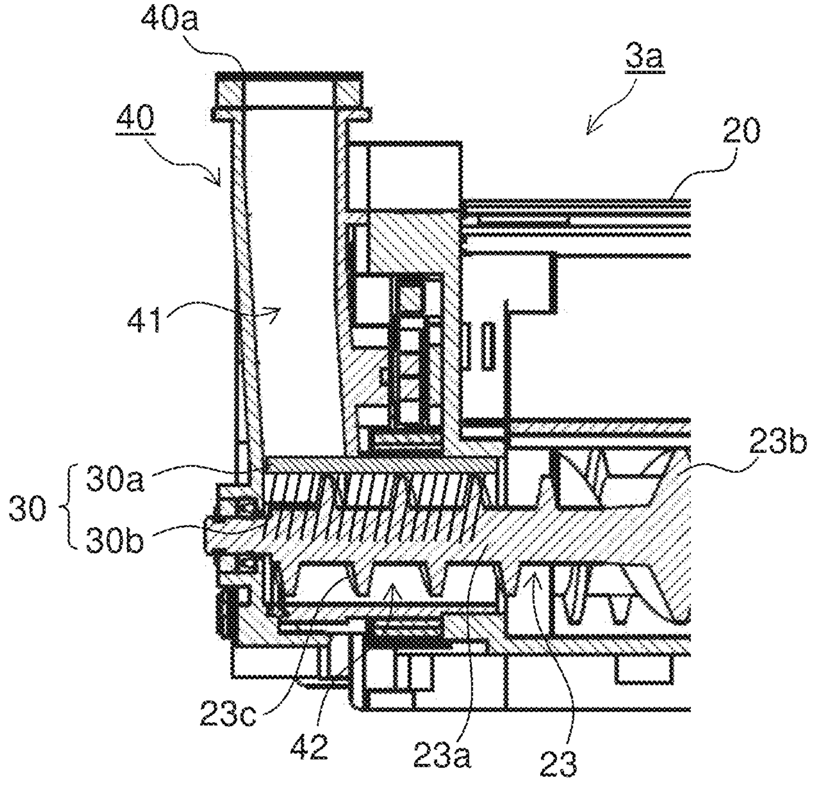
FIG. 10 is a partial sectional view of a developing device 3*a* including a toner feeding portion 40, showing an example where a brush member 30 is arranged in a horizontal conveying portion 42 in a toner feeding portion 40.

The present invention finds application not only in cleaning devices 7*a* to 7*d* but also in various types of toner conveying devices such as a waste toner conveying portion for conveying waste toner from cleaning devices 7*a* to 7*d* to a waste toner collection container and a toner feeding portion for feeding toner from toner containers 4*a* to 4*d* to developing devices 3*a* to 3*d*. FIG. 10 shows an example where the present invention is applied to a toner feeding passage to developing devices 3*a* to 3*d*.

FIG. 10 is a partial sectional view of a developing device 3*a* including a toner feeding portion 40 (toner conveying device). As shown in FIG. 10, the toner feeding portion 40 includes a vertical conveying portion 41 through which toner fed from a toner container 4*a* (see FIG. 1) through a toner feeding opening 40*a* is conveyed vertically (dropped) and a horizontal conveying portion 42 (toner conveying passage) through which the toner passed from the vertical conveying portion 41 is conveyed horizontally.

A rotary shaft 23*a* of a stirring/conveying screw 23 extends into the horizontal conveying portion 42. On the rotary shaft 23*a* of the stirring/conveying screw 23, in a part of it arranged in the horizontal conveying portion 42, is integrally formed a feeding blade 23*c*. The feeding blade 23*c* is formed as a helical blade pointing in the same direction (wound in the same direction) as the conveying blade 23*b* but having a smaller pitch and a smaller diameter than the conveying blade 23*b*.

In the horizontal conveying portion 42, a brush member 30 is arranged. The brush member 30 is arranged between a developer container 20 in the developing device 3*a* and the stirring/conveying screw 23 (feeding blade 23*c*). The brush member 30 is at one end fixed to the inner wall face of the developer container 20, and is at the other end left as a free end to extend up to a position where it makes contact with the feeding blade 23*c* of the stirring/conveying screw 23. The number, thickness, interval (pitch), and the like of the brush bristles 30*b* of the brush member 30 are similar to those in the brush member 30 arranged in the cleaning devices 7*a* to 7*d*.

With the structure shown in FIG. 10, the toner around the stirring/conveying screw 23 that falls through the vertical conveying portion 41 into the horizontal conveying portion 42 is loosened by the tip ends of brush bristles 30*b* and is moved by the feeding blade 23*c* without solidifying; thus, the toner in the horizontal conveying portion 42 is fed to the developing device 3*a* efficiently.

INDUSTRIAL APPLICABILITY

The present invention is applicable to toner conveying devices for conveying waste toner removed off the surface of an image carrying member, or toner to be fed to a developing device. Based on the present invention, it is possible to provide a toner conveying device which can effectively prevent toner from solidifying and thereby maintain stable toner conveyance performance as well as to provide a cleaning device and an image forming apparatus incorporating such a toner conveying device.

The invention claimed is:

1. A toner conveying device comprising:
a toner conveying passage through which toner is conveyed;
a conveying screw including
a rotary shaft rotatably arranged inside the toner conveying passage and
a helical blade formed on an outer circumferential face of the rotary shaft; and
a brush member on which a number of brush bristles that swing while in contact with an outer circumferential face of the conveying screw are planted at a predetermined interval along an axial direction of the conveying screw,
wherein
the brush member is configured such that
the brush bristles planted at one place are composed of one to three fibers, and that
root parts of the brush bristles are planted parallel to each other at a fixed interval of 0.5 to 3 mm.

2. The toner conveying device according to claim 1, wherein
the brush member is configured such that the brush bristles are arranged at a predetermined angle θ to a plane perpendicular to the rotary shaft.

3. The toner conveying device according to claim 2, wherein
the angle θ is set such that, when points at which the same brush bristle makes contact with the rotary shaft and with the helical blade are represented by P1 and P2 respectively, a distance Y between P1 and P2 in the axial direction is larger than a pitch X of the brush bristles.

4. The toner conveying device according to claim 1, further comprising:
flicker having a number of scraping pieces that swing while in contact with the outer circumferential face of the conveying screw, the flicker making contact with the outer circumferential face of the conveying screw from a side opposite from the brush member in a radial direction of the conveying screw.

5. The toner conveying device according to claim 4, wherein
the flicker is, at one end in a width direction thereof perpendicular to a longitudinal direction thereof, fixed to the toner conveying passage, and has, at another end, the scraping pieces formed perpendicularly to the rotary shaft with a fixed pitch larger than the pitch of the brush.

6. The toner conveying device according to claim 4, wherein
the flicker is, at one end in a width direction thereof perpendicular to a longitudinal direction thereof, fixed to a base end portion of the brush member, and the scraping pieces formed at another end of the flicker make contact with the outer circumferential face of the conveying screw from a side opposite from the brush bristles.

7. A cleaning device comprising:
a toner removing member for removing unused toner remaining on a surface of an image carrying member;
a housing for accommodating the toner removing member and for storing the unused toner removed by the toner removing member; and
the toner conveying device according to claim 1 which conveys the unused toner stored in the housing out of the housing.

8. An image forming apparatus mounted with the cleaning device according to claim 7.

9. An image forming apparatus mounted with the toner conveying device according to claim 1.

10. The image forming apparatus according to claim 9 comprising:
an image carrying member on which an electrostatic latent image is formed;
a developing device which feeds toner to the image carrying member to develop the electrostatic latent image into a toner image;
a toner container which supplies the toner to the developing device; and
the toner conveying device conveys the toner from the toner container to the developing device.

* * * * *